US008914738B2

United States Patent
Göbel

(10) Patent No.: US 8,914,738 B2
(45) Date of Patent: Dec. 16, 2014

(54) COMMUNITY-BASED WEB SERVICE USER INTERFACE ANNOTATIONS

(75) Inventor: Steffen Göbel, Dresden (DE)

(73) Assignee: SAP SE, Walldorf (DE)

( * ) Notice: Subject to any disclaimer, the term of this patent is extended or adjusted under 35 U.S.C. 154(b) by 147 days.

(21) Appl. No.: 13/339,673

(22) Filed: Dec. 29, 2011

(65) Prior Publication Data

US 2013/0174006 A1 Jul. 4, 2013

(51) Int. Cl.
*G06F 17/00* (2006.01)
(52) U.S. Cl.
USPC ........... 715/762; 715/738; 715/744; 715/747; 715/748; 715/749; 715/764; 715/788; 715/765; 705/26.5
(58) Field of Classification Search
CPC .. G06F 9/4443; G06F 3/048; G06F 17/30525
USPC ................. 715/738–764, 788, 765; 705/26.5
See application file for complete search history.

(56) References Cited

U.S. PATENT DOCUMENTS

| | | | |
|---|---|---|---|
| 2007/0220035 A1 | 9/2007 | Misovski | |
| 2007/0226751 A1* | 9/2007 | Brendle et al. | 719/313 |
| 2008/0127079 A1 | 5/2008 | Joss et al. | |
| 2009/0099882 A1* | 4/2009 | Karabulut | 705/7 |
| 2010/0023853 A1 | 1/2010 | Kamalakantha | |
| 2010/0162222 A1* | 6/2010 | Bou-Ghannam et al. | 717/168 |
| 2011/0119618 A1 | 5/2011 | Nestler et al. | |
| 2011/0246900 A1* | 10/2011 | Hedges | 715/738 |
| 2013/0030948 A1* | 1/2013 | Fisher, Jr. | 705/26.5 |

OTHER PUBLICATIONS

European Search Report for European Patent Application No. 12008316.7, dated May 17, 2013, 6 pages.
'ServFace' [online]. "Welcome to the ServFace Project Homepage," [retrieved on Jul. 9, 2012]. Retrieved from http://www.servface.eu, 3 pages.
ServFace Consortium: "D2.9: Models for Service Annotations, User Interfaces, and Service-based Interactive Applications" (final version), Jul. 2010, 67 pages.
ServFace Consortium: "D1.5: Methodology for Service-Based Interactive Application Development," Feb. 2010, 23 pages.
ServFace Consortium: "D2.12: Authoring Tools for user interface models and generation," Nov. 2010, 26 pages.
Spillner et al., "Ad-Hoc Usage of Web Services with Dynvoker," in *Proceedings of Service Wave 2008*, 2008, 208-219.

* cited by examiner

*Primary Examiner* — Quoc A Tran
(74) *Attorney, Agent, or Firm* — Fish & Richardson P.C.

(57) ABSTRACT

Implementations of the present disclosure include methods, systems, and computer-readable storage mediums for receiving, at a computing device, a technical service description associated with a web service, receiving, from an annotation repository, one or more first annotations to one or more user interface (UI) elements associated with the technical service description, the annotation repository electronically storing annotations to UI elements, refining at least one of the one or more UI elements based on one or more edits to the one or more UI elements, extracting one or more second annotations based on the one or more edits, and providing the one or more second annotations for storage in the annotation repository.

10 Claims, 4 Drawing Sheets

COMMUNITY-BASED WEB SERVICE USER INTERFACE ANNOTATIONS

BACKGROUND

The development of user interfaces (UI) for web service-based applications can be time consuming and expensive. UIs can be designed manually and are bound to the program code, which calls one or more web services implementing the business logic of the application. The concept of UI annotations for web services has been developed to simplify and speed up the development of UIs for web service-based applications. UI annotations capture additional information about design and behavior of UIs that can be used to automatically generate a UI for a particular web service. Technical service descriptions do not contain enough information to generate reasonably usable UIs. Annotations add, for example, human readable labels, grouping information, and validation information for input elements. Typically, the creation of UI annotations is a manual step, which is not efficient.

SUMMARY

Implementations of the present disclosure include computer-implemented methods including the actions of receiving, at a computing device, a technical service description associated with a web service, receiving, from an annotation repository, one or more first annotations to one or more user interface (UI) elements associated with the technical service description, the annotation repository electronically storing annotations to UI elements, refining at least one of the one or more UI elements based on one or more edits to the one or more UI elements, extracting one or more second annotations based on the one or more edits, and providing the one or more second annotations for storage in the annotation repository.

In some implementations, the one or more edits include an edit to an annotation of the one or more first annotations to provide an edited annotation, an annotation of the one or more second annotations including the edited annotation.

In some implementations, the one or more edits to the one or more UI elements include adding an annotation to a UI element of the one or more UI elements.

In some implementations, receiving includes receiving a plurality of first annotations associated with a UI element. Actions can further include displaying annotations of the plurality of annotations in rank order based on respective counts associated with each annotation. Actions can further include receiving user input, the user input including a selection of an annotation of the plurality of annotations, and providing a UI element based on the selection.

In some implementations, storage in the annotation repository includes: receiving a first annotation associated with a UI element of a web service, determining that the first annotation has been previously stored, and, in response to determining that the first annotation has been previously stored, incrementing a count associated with the first annotation.

In some implementations, storage in the annotation repository includes: receiving a first annotation associated with a UI element of a web service, determining that the first annotation is a new annotation to the UI element, and, in response to determining that the first annotation is a new annotation, storing the first annotation and associating an initial count with the first annotation.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to automatically creating annotations to elements (e.g., user interface (UI) elements) for web services. In some implementations, a service provider provides a technical description of one or more web services to a service broker, and the service broker stores a registry listing the one or more web services. A service consumer searches for a web service by providing a search query to the service broker. The service broker provides a listing of web services to the web service in response to the search query, with the service consumer selecting one or more of the listed web services. The service consumer is provided a technical service description of the selected web service from the service provider. The service consumer is further provided, if available, UI annotations associated with the web service from an annotation provider. In some implementations, the service consumer makes original or additional annotations to the web service (specifically, the UI elements) and provides the annotations to the annotation provider.

The annotation provider stores the annotations. Accordingly, the service consumer is able to "build off" previous annotations to the web service.

Figure 1:
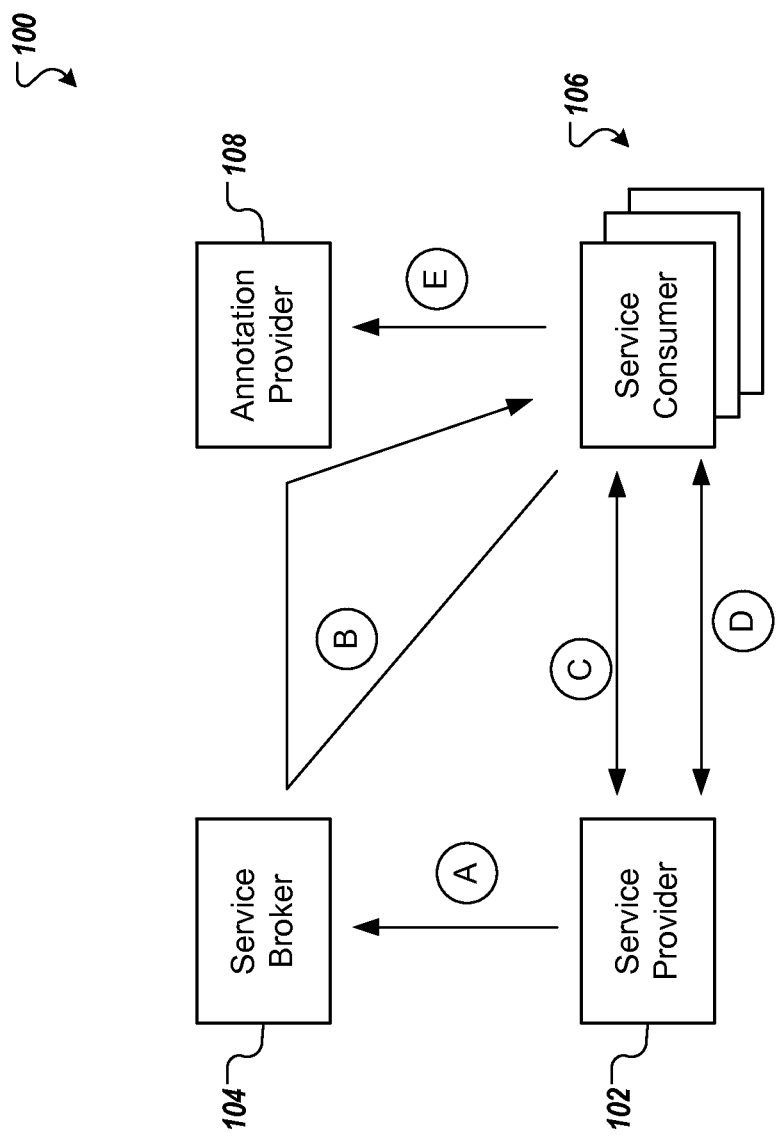
FIG. 1 is an example system for creating and storing web service element annotations.

FIG. 1 is an example system 100 for creating and storing web service element annotations. System 100 includes a service provider 102, a service broker 104, one or more service consumers 106, and an annotation provider 108.

The service provider 102 provides (e.g., builds) a web service. In some implementations, the web service enables communication between a plurality of electronic devices over a network (e.g., the Internet). In some examples, a web service can be provided as a software system that supports interoperable machine-to-machine interaction over the network. The web service can have an interface described by a technical service description. In some examples, the technical description can be provided in Web Services Description Language (WSDL). Other systems are able to interact with the web service in a manner prescribed by its description. In some examples, interaction is achieved using Simple Object Access Protocol (SOAP) messages. In some examples, the service provider 102 provides the web services to offer a certain functionality (e.g., to process data) or to grant access to a certain resource (e.g., access to a database). The service provider 102 can provide the web services by describing the service interaction and data flow within the technical service description of the web service.

In some implementations, the service broker 104 provides a registry that publishes the technical service description of the web services. In some implementations, the service broker 104 provides at least a portion of the description of a web service as determined by the service broker 104. In some implementations, the service broker 104 can include categories of web services. Additionally, the service broker 104, for each web service, provides a listing of the service consumers 106 that are able to receive the web service. In some examples, the service broker 104 can be based on technologies such as the universal description discovery and integration (UDDI), the electronic extensible markup language (ebXML), and the metadata registry (MDR) standard.

The service consumers 106 (or web service clients) bind to the service provider 102 to invoke one of the web services. In some examples, the service consumer 106 can place a call to one of the web service operations of the web service. In some implementations, the service consumers 106 are able to access multiple web services (e.g., the service provider 102 provides multiple web services). In accordance with the present disclosure, the service consumers 106 are able to create annotations to web service elements (e.g., web service UI elements). The annotations are associated with the technical service description that can be used during UI generation, composition of the web service, runtime generation of the web service, and during runtime of the web service. The annotations describe additional information about a design and a behavior of the web service UI that can be used to create the web service UI, described further below. In other words, the annotations offer possibilities to the UI elements (e.g., how the web service UI could look). For example, annotations add human-readable labels, grouping information, and/or validation information for input elements of the web service UI. In some implementations, the annotations are relevant or specific to certain platforms and modalities.

The annotation provider 108 stores annotations to the web service (i.e., the annotation provider 108 is a repository for the annotations to the web service), and particularly, annotations to the web service UI elements. The annotations to the web service can include edits to the web service UI elements. The annotation provider 108 facilities access to the annotations to the web services by providing a central repository. The central repository enables any service consumer 106 to access the annotations and add annotations to the annotation provider 108, as detailed further below. Furthermore, each web service can include data types and data type elements that represent data types that are declared or imported in the technical service description of the web services. Accordingly, the annotations can be used by one web service (e.g., a local data type, LDT) or can be used by two or more web services (e.g., a global data type, GDT). GDT facilitates the reuse of annotations. For example, if a data type is used in more than one web service, the annotation needs to be made only once and can be reused in all occurrences across the web services. An annotation model is provided by the annotation provider 108 for each web service and for each GDT, with the annotation model stored by the annotation provider 108. In some implementations, the annotation model is stored as a single self-contained file. In some examples, the annotation model for a particular web service points to the corresponding technical service description of the web service. In some examples, the annotation model for a GDT points to an XML schema document (XSD) with the schema definition for the type. Additionally, and as a result of the GDTs being declared in the technical service description files of two or more web services, the annotation repository 108 can be able to extract the schema from the technical service description file and store it in a separate file. The annotations can be stored by the annotation provider 108 separate from the technical service description. In this manner, the annotation provider 108 is unable to alter (e.g., change) the technical service description of the web service. In some implementations, the service provider 102, the service broker 104, or both, can include the annotation provider 108.

In some examples, the service provider 102 provides the technical service description for one or more web services to the service broker 104 (A); and the service consumer 106 searches for a web service via the registry of the service broker 104 and receives a reference to the at least one web service from the service broker 104 as well as annotations to the web service from the annotation provider 108 (B). For example, and in response to a search query received from the service consumer 106, the service broker 104 provides the reference to the at least one web service to the annotation provider 108, which identifies previously stored annotations that are associated with the at least one web service. The reference to the at least one web service and the annotations (if any) are provided to the service consumer 106. The service consumer 106 downloads the technical service description of the web service from the service provider 102 (e.g., using the reference to request the associated technical service description) (C); the service consumer 106 uses the web service by calling the service operations and receiving the results (D); and the service consumer 106 provides annotations of the web service to the annotation provider 108 (E).

In some implementations, the service provider 102 provides the technical service description for one or more web services to the service broker 104 (A). In some examples, the service provider 102 provides the technical service description, including service metadata and the uniform resource locator (URL), of each web service that the service provider 102 determines to allow access (e.g., expose) to the service broker 104. The service provider 102 further determines which category the web service is listed in by the servicer broker 104.

In some examples, the service consumer 106 searches for a web service via the registry of the service broker 104 and receives a reference to the at least one web service from the service broker 104. The reference is also provided to the annotation provider 108, which provides annotations to the particular web service to the service consumer 106 (B). Specifically, the service consumer 106 locates entries in the registry of the service broker 104 using various find operations (e.g., the service consumer 106 provides a search query for service functionality, service metadata, or both). In some implementations, the service broker 104 returns a listing of web services in response to the search query. The listing of web services can include references to one or more web services provided by the service provider 102. The service consumer 106 can select one or more of the listed web services. In some implementations, the service broker 104 provides a portion of the technical service description of the selected web service to the service consumer 106.

Furthermore, the service consumer 106 can receive annotations, if previously stored, to the selected web service from the annotation provider 108. In some examples, the annotation provider 108 can store annotations to the one or more web services. In some examples, the annotations can have been previously provided by one or more of the service consumers 106, described further below. In some implementations, the annotation provider 108 provides the annotations to the service consumer 106 in response to the search query (e.g., the service consumer 106 provides the search query to, in addition to the service broker 104, to the annotation provider 108). In some implementations, the annotation provider 108 provides the annotations to the service consumer 106 in response to a request from the service broker 104. The service broker 104 can request annotations for each web service of the listing (e.g., prior to the service consumer 106 selecting one of the web services of the listing) or request annotations for a selected web service of the listing. In some implementations, the annotation provider 108 does not include annotations for the one or more web series. For example, the service consumers 106 have not previously provided annotations for the one or more web services to the annotation provider 108. Thus, when the search consumer 108 selects one or more web services from the listing, the search consumer does not receive annotations for the selected web services.

In some implementations, the service consumer 106 downloads the technical service description of the web service from the service provider 102 (C). Specifically, the service consumer 106 receives a listing of web services from the service broker 104 in response to a search query. The service consumer 106 selects one or more web services from the listing, and receives from the service broker 104, the technical service description for the selected web services. In some examples, the service consumer 106 requests the technical service description for the selected web services from the service provider 102 and binds to the service provider 102 to invoke the web services. In some implementations, as mentioned above, the service broker 104 can provide a portion of the technical service description of the selected web service to the service consumer 106. Accordingly, the service consumer 106 can use the portion of the technical service description to send a request to the service provider 102 for the web service. In response, the service provider 102 can provide the web service to the service consumer 106 matching the portion of the technical service description. In some implementations, providing the web service includes providing access to the web service.

In some implementations, the service consumer 106 uses the web service by calling the service operations and receiving the results (D). Specifically, the service consumer 106 develops applications that utilize (e.g., invoke) the web service.

In some implementations, the service consumer 106 provides annotations of the web service to the annotation provider 108 (E). In some examples, the service consumer 106 refines web service elements (e.g., web service UI elements) by providing edits to the web service elements. Refining the web service elements can include "improving" the look, feel, and/or usability of the web service UI, described further below. Each editing command provided by the service consumer 106 is recorded by the service consumer 106 and can be provided to the annotation provider 108 to be stored. In some examples, the service consumer 106 extracts annotations corresponding to each editing command performed on the web service elements, and provides the annotations to the annotations provider 108. In some implementations, the service consumer 106 performs editing commands on web service elements associated with existing annotations (e.g., annotations provided by the annotation provider 108 in (C)), described further below. The annotation provider 108 stores the annotations relative to the particular technical service description associated with the web service.

In some examples, the elements of the web services can be described by the concepts of "web service," "operation," "parameter," and "data type." The web service contains a set of service operations. Annotations to the service operations are either global properties for all service operation elements, or refer directly to the web service (e.g. a label or tooltip can be assigned to a web service for display). A service operation is invoked to get results from, or manipulate data on, a server, for example. An operation has data to be sent during the invocation, and data returning as the result of the invocation. Annotations attached to an operation can refer to the operation itself, or to the parameters.

In some examples, parameters and their sub-elements represent all data needed to be sent for proper invocation of a service operation, as well as the data returning as a result. Parameters fall in different categories, including input and output parameters. Additionally, service or transportation technology specific data can be sent to the web service (e.g., a SOAP header), as well as return data (e.g., error messages of WSDL services that indicate communication failures). Thus, to have a generic and extendable way of organizing the outgoing and incoming data for an operation, parameters can be organized in parameter sets. In some examples, each parameter set has a category specifying the meaning of the parameters. For example, two categories can include input for input parameters and output for output parameters. Additional categories can be defined for each service/transportation technology. The annotations of a parameter refer to the parameter itself or to sub-elements of the parameter. In addition to the annotations to the parameter, the parameters data type can include annotations, as well as data type elements of the data type. Data types and their sub-elements represent the data types declared or imported in a service description. As mentioned above, data types can include local data types or global data types.

Example annotations to the web service elements can include, among others annotations:
- changing the label of an UI control (e.g., input/output field), optional support of several languages (internationalization);
- adding tool tips and help messages to an UI control for several languages, optional support of several languages (internationalization);
- showing and hiding of UI controls for certain web service parameters (e.g., certain technical web service parameters are not exposed to the user of an application);
- reordering of UI controls;
- grouping of UI controls (e.g., all fields belonging to an address like city, street, house number, zip code, country);
- changing the type of an UI control (e.g., combination box instead of text field);
- adding constraints to an UI control (e.g., allow only certain text strings to be entered);

marking mandatory and optional input fields;
marking password fields where input is not displayed on the screen (e.g., stars);
definition of default values for input fields;
definition of predefined values for input fields (e.g., for a combination box); and
definition of other data sources (e.g., another web service operation) for retrieving value proposals in input fields.

Figure 2:
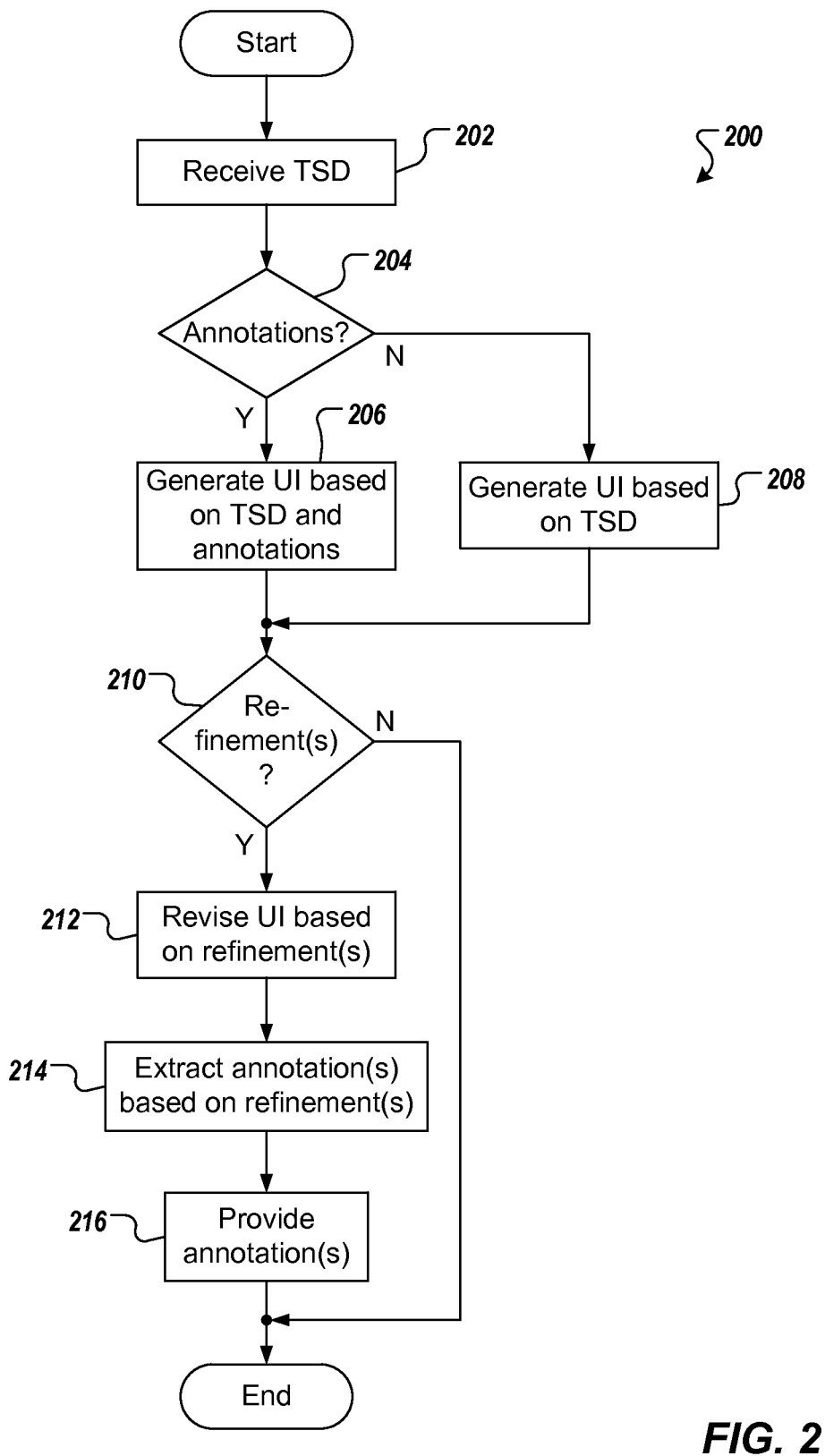
FIG. 2 is a flowchart depicting an example process for creating web service element annotations.

FIG. 2 is a flowchart depicting an example process for creating web service element annotations. The example process 200 can be executed using one or more computing devices. For example, the system 100 can be used to execute the example process 200.

A technical service description for a web service is received (202). For example, the service consumer 106 receives the technical service description for (e.g., associated with) a web service from the service provider 102. In some implementations, the service consumer 106 receives the technical service description in response to providing a search query to the service broker 104. In some implementations, the service consumer 106 receives the technical service description in response to providing the search query to the service broker 104, receiving a portion of the technical service description for a particular web service from the service broker, and providing the portion of the technical service description to the service provider 102. In some implementations, the service consumer 106 can receive the technical service description for two or more web services (e.g., when the service consumer 106 selects two or more web services from a listing of web services in response to a search query).

It is determined whether annotations are associated with the particular web service (204). For example, it is determined whether the annotation provider 108 includes (e.g., stores) annotations to the web service. In some implementations, the associations between the annotations and each web service element of the particular web service can be stored in a relational database or in a file. Also, each web service element can be associated with one or more annotations. The annotation provider 108, the service broker 104, or both, can determine whether the annotation provider 108 includes annotations to the web service. In some implementations, it is determined whether annotations are associated with the particular web service in response to the service broker 104 receiving from the service consumer 106 the search query, the service broker 104 receiving a selection of a web service from a listing, or both. The annotations can be previously provided by the service consumers 106, described further below.

If it is determined that there are existing annotations to the web service, the web service UI is generated based on the technical service description and the annotations (206). For example, the service consumer 106 generates the web service UI based on the technical service description, received from the service provider 102, and the annotations of the particular web service, received from the annotation provider 108. Thus, the generated web service UI is provided based on annotations to one or more of the web service elements (e.g., web service UI elements). In some implementations, the service consumer 106 receives two or more annotations for at least one web service element (e.g., a web service element can be associated with two or more annotations). Thus, when the service consumer 106 generates the web service UI, for each web service element associated with two or more annotations, the web service element is edited with one of the annotations of the two or more associated annotations. In some implementations, the annotations can be displayed in a list of annotations and can be ordered based on a rank order. In some examples, the rank order can be determined based on a frequency of use of the respective annotations. For example, for a particular UI element, a first annotation can be associated with a first count and a second annotation can be associated with a second count. The first count and the second count can reflect how often the first and second annotations, respectively, are implemented for the particular UI element. The rank order can be determined based on the counts, where the annotation associated with a higher count is listed higher in the list of annotations. By way of non-limiting example, for the web service element "username" parameter, the annotation provider 108 can provide two or more annotations such as "User Name" and "Login Name." The "User Name" annotation is selected for the web service element "username" as a result of having been utilized more than the "Login Name" annotation by the service consumers 106. The service consumer 106, the annotation provider 108, or both, can select the most frequent annotation for the web service element.

In some implementations, when the service consumer 106 receives two more annotations for at least one web service element, the service consumer 106 generates the web service UI such that the web service element is presented with an option for selection by the service consumer 106 of one of the two or more associated annotations, e.g., via listing of the two or more associated annotations. In some implementations, the annotations are ordered by the number of usages (e.g., the frequency), as discussed above. In some implementations, the annotations are ordered by the number of usages from highest to lowest. In some implementations, the listing includes annotations having a frequency (e.g., count) above a threshold. The threshold can be determined by the annotation provider 108, the service consumer 106, or both. In some implementations, the service broker 104 can request that the annotation provider 108 provides the annotations to the service consumer 106.

If it is determined that the annotation provider 108 does not include annotations to the web service, the web service UI is generated based on the technical service description (208). For example, the service consumer 106 generates the web service UI based on the technical service description received from the service provider 102. For example, names of data types and parameters in the service operation are used as labels for input/output fields and data types are used to select a suitable UI control (e.g. text input field for a string type, calendar for a date type, check box for a Boolean type).

It is determined whether refinements to the web service are generated (210). For example, the service consumer 106 can edit the UI elements, which edits can represent refinements to the UI. In some examples, refinements to the web service include refining one or more of the web service elements (e.g., the web service UI elements) based on edits to the one or more web service elements. The edits to the web service elements include any of the edits mentioned above, among other edits. In some implementations, refining the web service elements can include refining one of the web service elements having one or more previous annotations (e.g., received annotations from the annotation repository 108). Particularly, the service consumer 106 can provide an edit to one or more of the web service elements that has one or more associated annotations. Continuing the example above, for the web service element "username" parameter, the service consumer 106 can provide the refinement (e.g., edit) of "Access Name." The provided refinement is in addition to the previous annotations received from the annotation provider of "User Name" and "Login Name." In some implementations, the refinements to the web service elements can include selection by the service consumer 106 of one of the provided annotations. Specifically, as mentioned above, the service consumer 106 can receive two or more annotations for least one of web service elements. Thus, refining the at least one web service element can include selection of one of the two or more annotations (e.g., the service consumer 106 selecting the highest ranked or most frequent annotation).

If it is determined that refinements are generated, the web service UI is revised based on the refinements (212). For example, the service consumer 106 revises the web service UI based on the refinements and the received technical service description of the web service. Revising the web service UI can include generating the web service UI based on the refinements provided by the service consumer 106. The refinements provided by the service consumer 106 can include newly created refinements to web service elements, selection of one or more received annotations for the web service elements, or both.

The annotations are extracted from the web service UI based on the refinements (214). For example, the service consumer 106, the annotation provider 108, or both, extracts the annotations from the refinements generated by the service consumer 106 to the web service elements. The annotations are extracted based on the one or more edits to the one or more web service elements. In some implementations, the extracted annotations can include each annotation of the web service elements. For example, the extracted annotations can be based on refinements provided by the service consumer 106, received annotations from the annotation provider 108, or both.

The annotations are provided to the annotation provider 108 (216). Specifically, the service consumer 106 provides the (extracted) annotations to the annotation provider 108. The annotation provider 108 stores the annotations in one or more repositories. Further, the annotation provider 108 stores the annotations relative to each web service element, e.g., associations between each web service element and the annotations to the web service element. Also, the annotation provider 108 stores the annotations relative to the particular technical service description of the particular web service. When an annotation to a web service element is previously stored by the annotation provider 108 (e.g., for the same type and content), a counter is employed, described further below.

Figure 3:
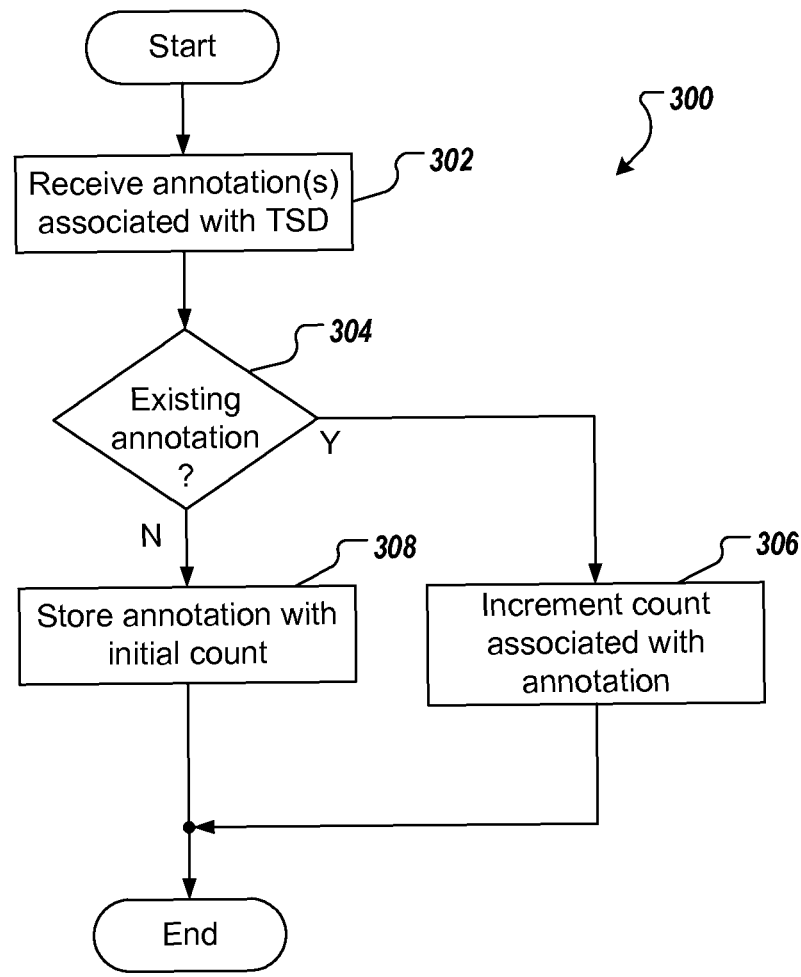
FIG. 3 is a flowchart depicting an example process for storing web service element annotations.

FIG. 3 is a flowchart depicting an example process for storing web service element annotations. The example process 300 can be executed using one or more computing devices. For example, the system 100 can be used to execute the example process 300.

Annotations associated with a technical service description of a web service are received (302). For example, the annotation provider 108 receives the annotations from the service consumers 106. In some implementations, the received annotations can include updates to annotations that were previously provided to the service consumers 106. In some examples, the annotation provider 108 can receive the annotations from the service consumer 106 in response to a request by the annotation provider 108 for the annotations from the service consumer 106. In some examples, the service consumer 108 can automatically provide the annotations to the annotation provider 108 after the annotations are generated.

It is determined whether the received annotations are previously existing (304). For example, the annotation provider 108 determines whether the received annotations are already stored and associated with the respective technical service description. In some implementations, the annotation provider 108 can compare the received annotations to the stored annotations for the associated technical service description for the particular web service. Additionally, the annotation provider 108 can compare the received annotations for the specific web service element to stored annotations for the specific web service element.

If it is determined that one or more of the received annotations previously exist, for each annotation that was previously received, a count associated with the received annotation is incremented (306). For example, the annotation provider 108 determines that one or more of the received annotations are previously included by (e.g., stored by) the annotation provider 108. Furthermore, each annotation stored by the annotation provider 108 includes an associated count. The count of the annotation is a frequency of usages of the annotation with respect to the associated web service element (e.g., a number of times the annotation was used by the service consumers 106 for the web service element). Thus, the more an annotation is used by the service consumers 106, the higher the associated count. For each received annotation that is previously stored by the annotation provider 108, the annotation provider 108 increases the count of the annotation.

If it is determined that one or more of the received annotations are not previously existing, for each annotation that was not previously existing, the annotation is stored and an initial count is associated with the annotation (308). For example, the annotation provider 108 determines that one or more of the received annotations are not previously included by (e.g., stored by) the annotation provider 108. Thus, the annotation provider 108 stores the new annotation. The new annotation is stored with respect to the technical service description of the particular web service, and further, associated with the web service element that it annotates. Additionally, the annotation provider 108 associates an initial count (e.g., one) with the new annotation.

Figure 4:
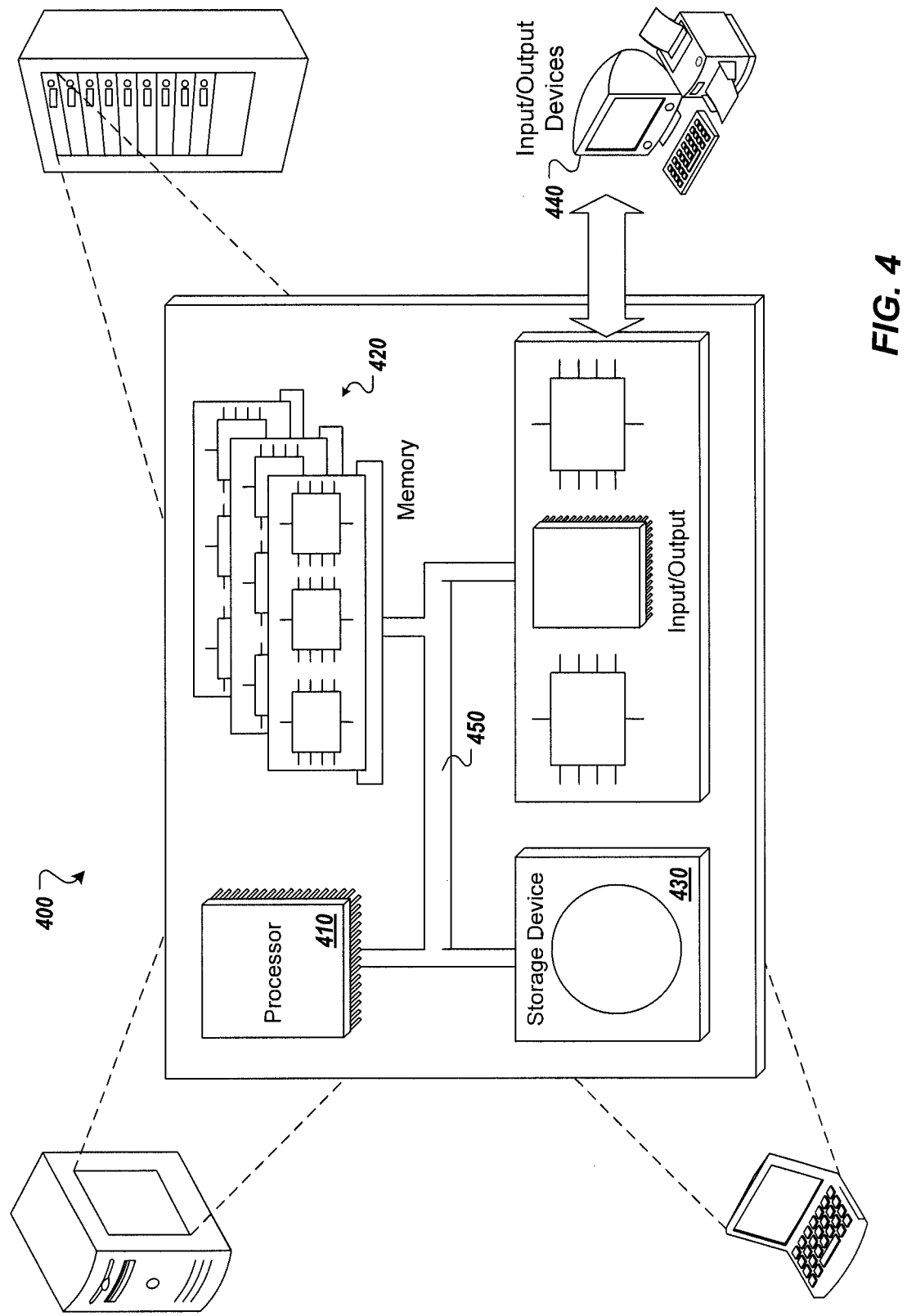
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 can be included in any or all of the server components discussed herein. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 can be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces. In other implementations, the input/out device 440 includes a touch interface.

The features described can be implemented in digital electronic circuitry, or in computer hardware, firmware, software, or in combinations of them. The apparatus can be implemented in a computer program product tangibly embodied in an information carrier, for example, in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), a LCD (liquid crystal display) monitor, or a plasma display for displaying information to the user and a keyboard and a pointing device such as a mouse, a trackball, or a touch display by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

A number of implementations of the present disclosure have been described. Nevertheless, it will be understood that various modifications can be made without departing from the spirit and scope of the present disclosure. Accordingly, other implementations are within the scope of the following claims.

What is claimed is:

1. A computer-implemented method of providing annotations to a technical service description associated with a web service, the method being executed using one or more processors and comprising:

receiving, by the one or more processors, a technical service description associated with a web service;

receiving, by the one or more processors and from an annotation repository, one or more first annotations to one or more user interface (UI) elements associated with the technical service description, at least one annotation of the one or more first annotations being provided based on editing of the one or more UI elements, the one or more first annotations comprising information about a design and a behavior of the one or more UI elements, the annotation repository electronically storing annotations to UI elements;

receiving, from a user, one or more edits to the one or more UI elements;

refining at least one of the one or more UI elements based on the one or more edits to the one or more UI elements;

extracting one or more second annotations based on the one or more edits; and providing the one or more second annotations for storage in the annotation repository.

2. The method of claim 1, wherein the one or more edits include an edit to an annotation of the one or more first annotations to provide an edited annotation, an annotation of the one or more second annotations comprising the edited annotation.

3. The method of claim 1, wherein the one or more edits to the one or more UI elements comprise adding an annotation to a UI element of the one or more UI elements.

4. The method of claim 1, wherein receiving includes receiving a plurality of first annotations associated with a UI element.

5. The method of claim 4, further comprising displaying annotations of the plurality of annotations in rank order based on respective counts associated with each annotation.

6. The method of claim 5, further comprising:

receiving user input, the user input comprising a selection of an annotation of the plurality of annotations; and providing a UI element based on the selection.

7. The method of claim 1, wherein storage in the annotation repository comprises:

receiving a first annotation associated with a UI element of a web service;

determining that the first annotation has been previously stored; and in response to determining that the first annotation has been previously stored, incrementing a count associated with the first annotation.

8. The method of claim 1, wherein storage in the annotation repository comprises:
receiving a first annotation associated with a UI element of a web service;
determining that the first annotation is a new annotation to the UI element; and
in response to determining that the first annotation is a new annotation, storing the first annotation and associating an initial count with the first annotation.

9. A non-transitory computer-readable storage medium coupled to one or more processors and having instructions stored thereon which, when executed by the one or more processors, cause the one or more processors to perform operations comprising:
receiving a technical service description associated with a web service;
receiving, from an annotation repository, one or more first annotations to one or more user interface (UI) elements associated with the technical service description, at least one annotation of the one or more first annotations being provided based on editing of the one or more UI elements, the one or more first annotations comprising information about a design and a behavior of the one or more UI elements, the annotation repository electronically storing annotations to UI elements;
receiving, from a user, one or more edits to the one or more UI elements;
refining at least one of the one or more UI elements based on the one or more edits to the one or more UI elements;
extracting one or more second annotations based on the one or more edits; and
providing the one or more second annotations for storage in the annotation repository.

10. A system, comprising:
a computing device; and
a non-transitory computer-readable storage device coupled to the computing device and having instructions stored thereon which, when executed by the computing device, cause the computing device to perform operations comprising:
receiving a technical service description associated with a web service;
receiving, from an annotation repository, one or more first annotations to one or more user interface (UI) elements associated with the technical service description, at least one annotation of the one or more first annotations being provided based on editing of the one or more UI elements, the one or more first annotations comprising information about a design and a behavior of the one or more UI elements, the annotation repository electronically storing annotations to UI elements;
receiving, from a user, one or more edits to the one or more UI elements;
refining at least one of the one or more UI elements based on the one or more edits to the one or more UI elements;
extracting one or more second annotations based on the one or more edits; and
providing the one or more second annotations for storage in the annotation repository.

* * * * *